United States Patent [19]
Amey

[11] Patent Number: 5,636,554
[45] Date of Patent: Jun. 10, 1997

[54] VARIABLE LENGTH CRANK ARM

[76] Inventor: Mark A. Amey, 189 Blue Rocks Rd., Lenhartsville, Pa. 19534

[21] Appl. No.: 566,148

[22] Filed: Dec. 1, 1995

Related U.S. Application Data

[63] Continuation of Ser. No. 217,427, Mar. 24, 1994, abandoned.

[51] Int. Cl.⁶ .................................................. G05G 1/14
[52] U.S. Cl. ............................................................ 74/594.3
[58] Field of Search ................................. 74/594.3, 601, 74/602

[56] References Cited

U.S. PATENT DOCUMENTS

| | | | |
|---|---|---|---|
| 563,821 | 7/1896 | Unruh | 74/594.3 |
| 597,911 | 1/1898 | Morris | 74/594.3 |
| 2,316,530 | 4/1943 | Nilsen | 74/594.3 |

FOREIGN PATENT DOCUMENTS

| | | | |
|---|---|---|---|
| 165015 | 10/1933 | Switzerland | 74/594.3 |
| 24995 | of 1895 | United Kingdom | 74/594.3 |
| 19530 | of 1895 | United Kingdom | 74/594.3 |

*Primary Examiner*—Richard M. Lorence
*Attorney, Agent, or Firm*—Synnestvedt & Lechner

[57] ABSTRACT

A variable length crank arm assembly for transferring energy to the power train of a bicycle, the assembly including a primary crank arm attached to a secondary crank arm by a rotatable coupling. The rotatable coupling enables the secondary crank arm to be rotated to extended and retracted positions during the power and unloading strokes of a pedal cycle. The variable length crank arm is biased to impart a continuous force to rotate the secondary crank arm toward its retracted position, and a stop limits the rotation of the secondary crank arm to establish the extended and retracted positions.

29 Claims, 6 Drawing Sheets

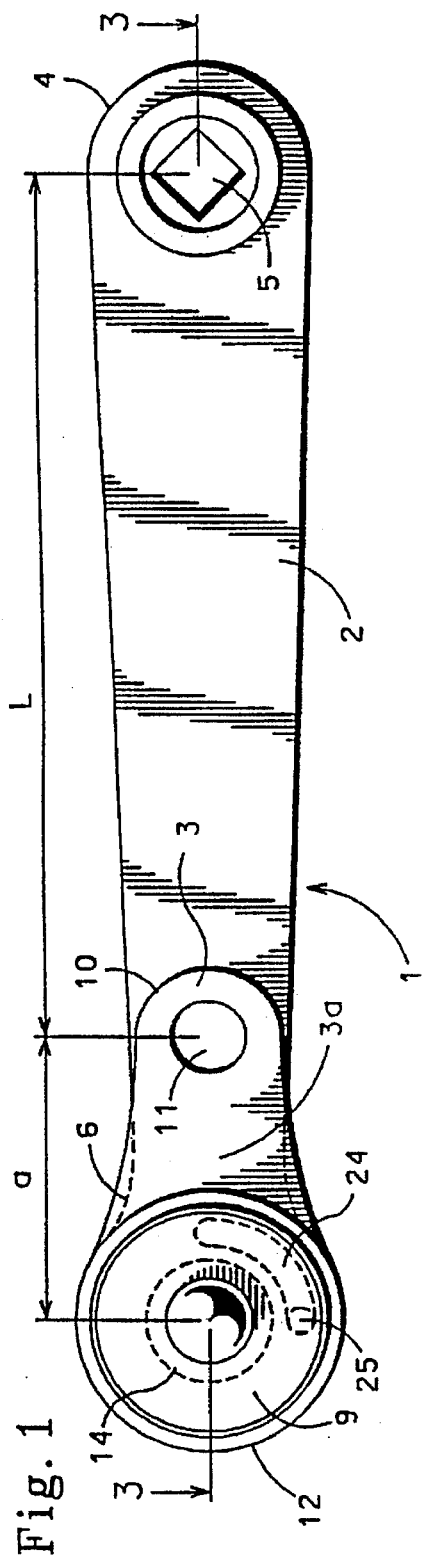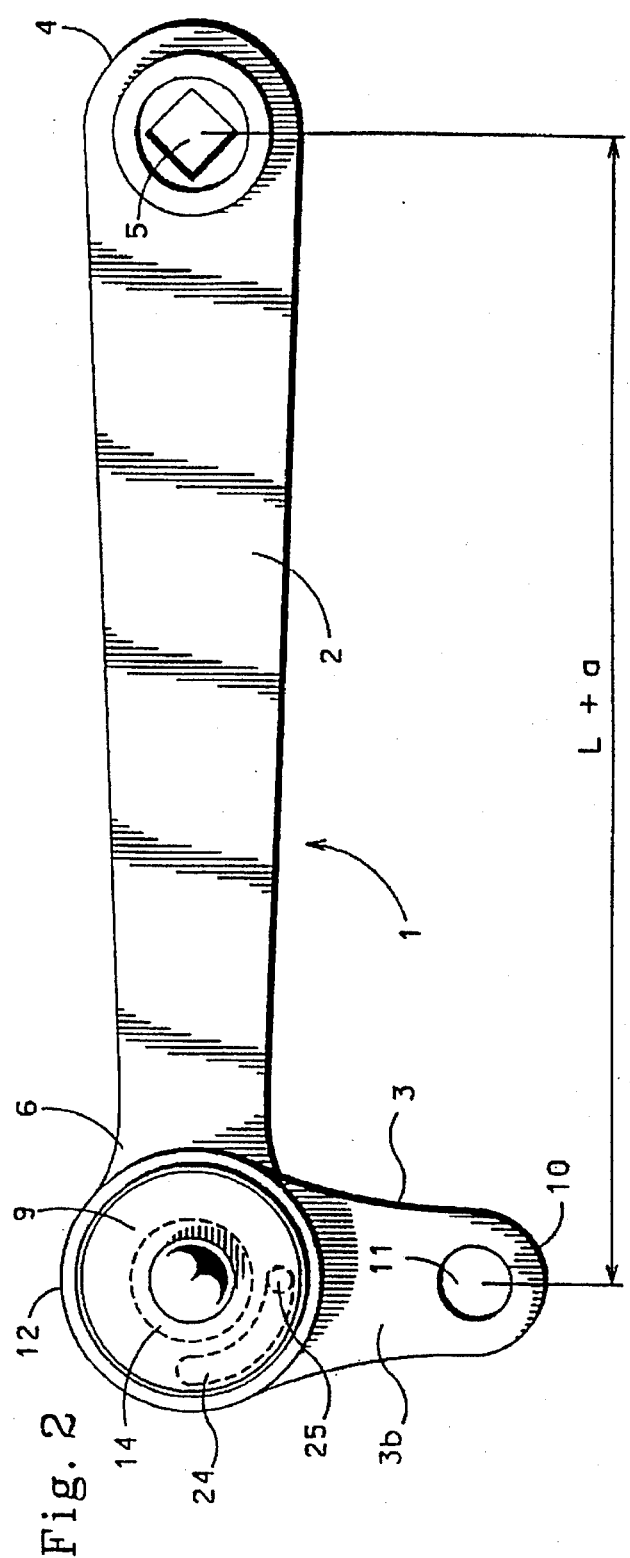

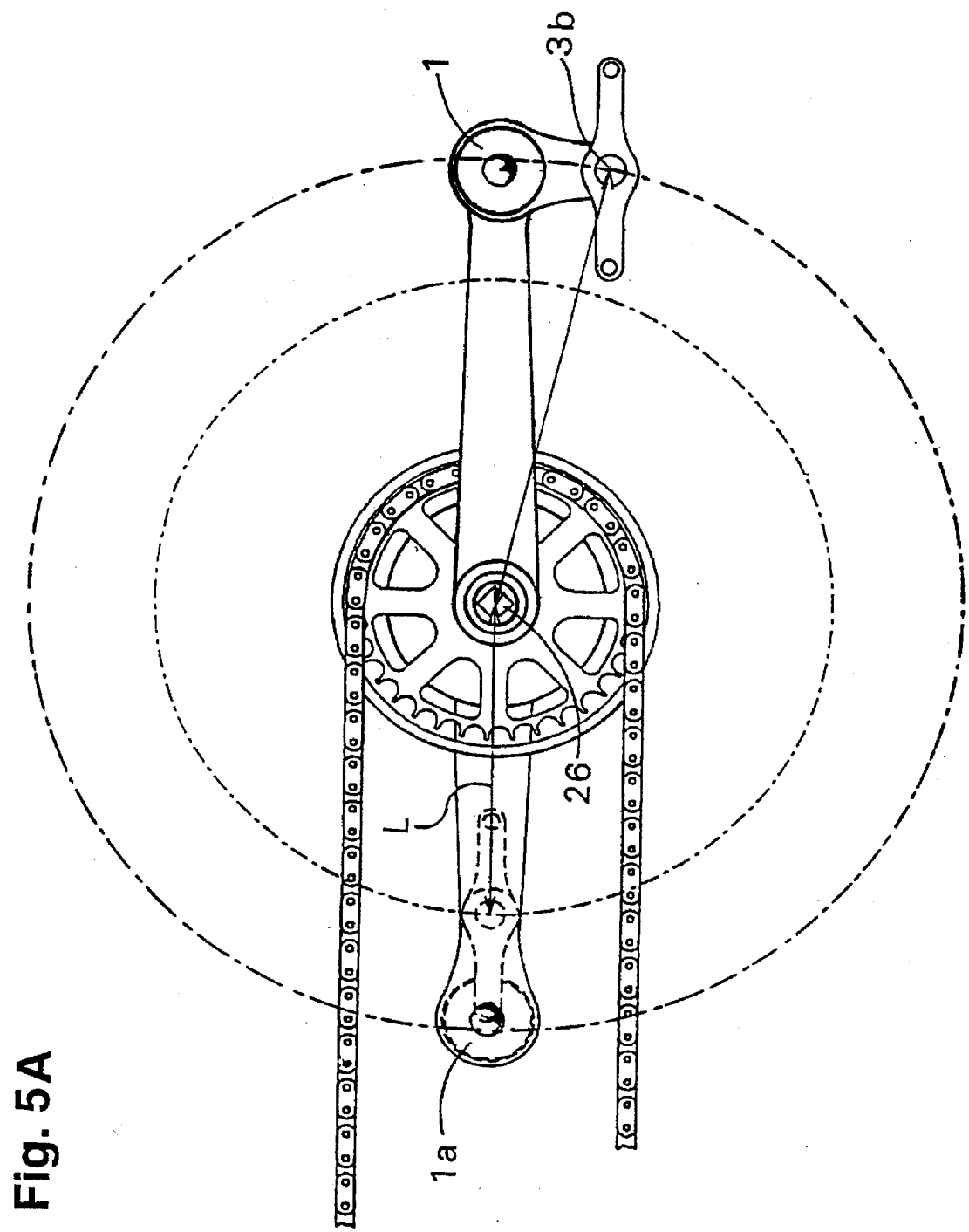

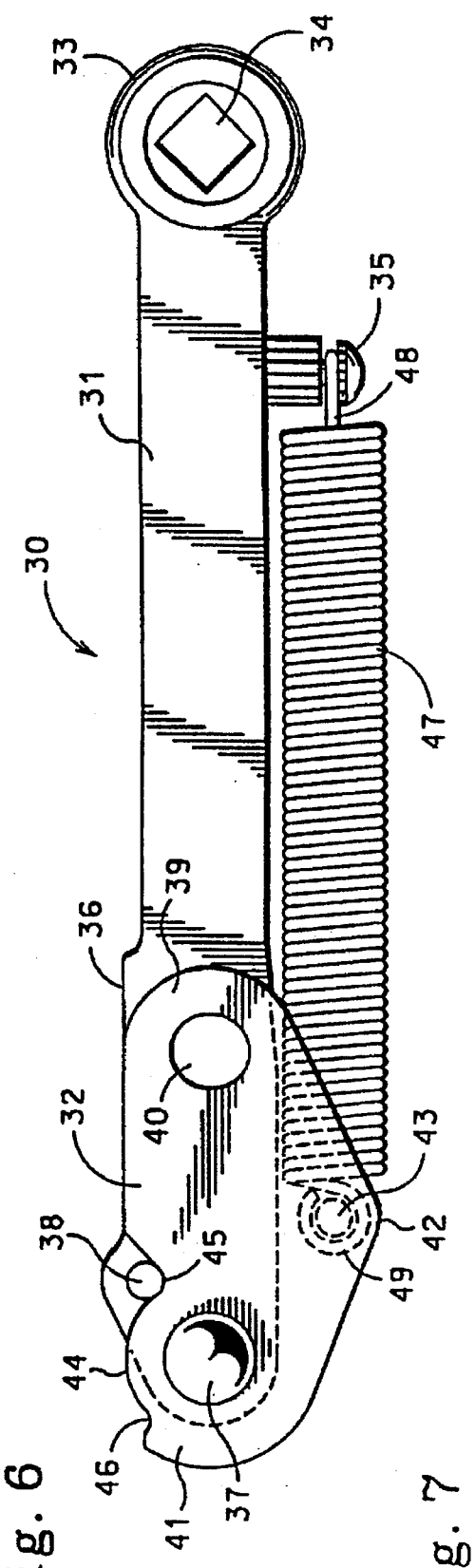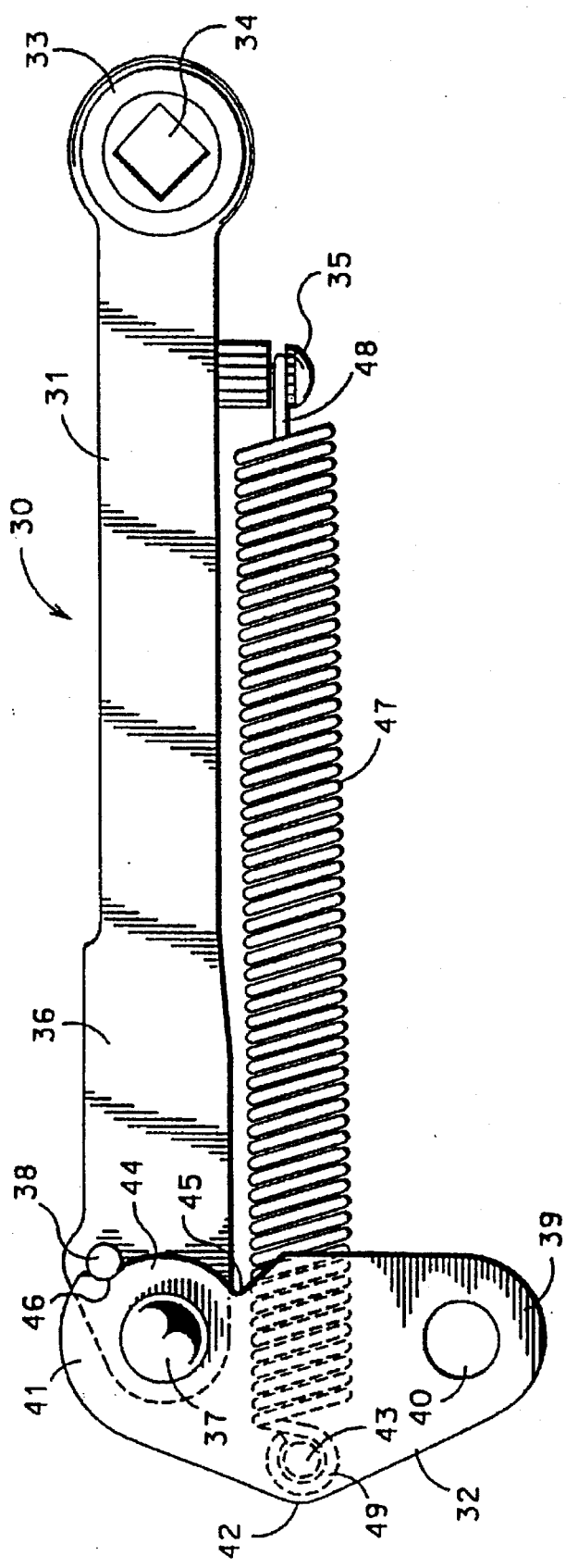
Fig. 6
Fig. 7

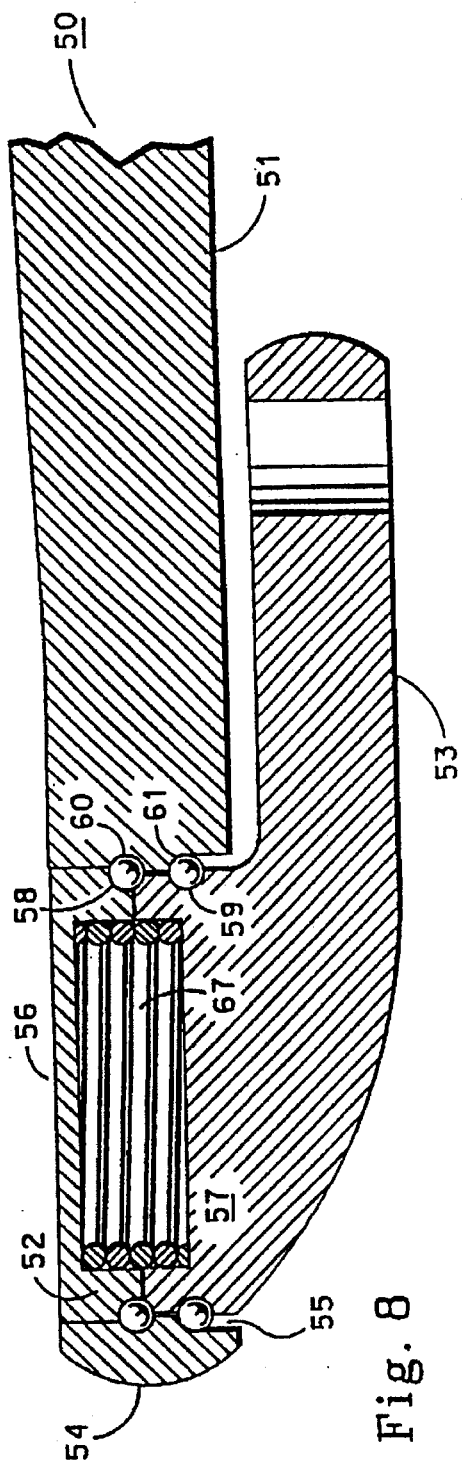
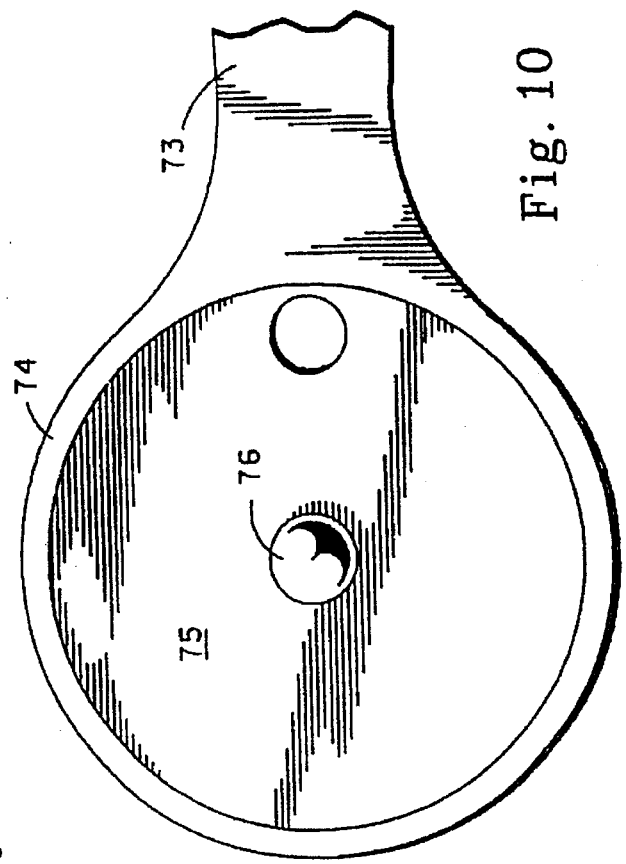
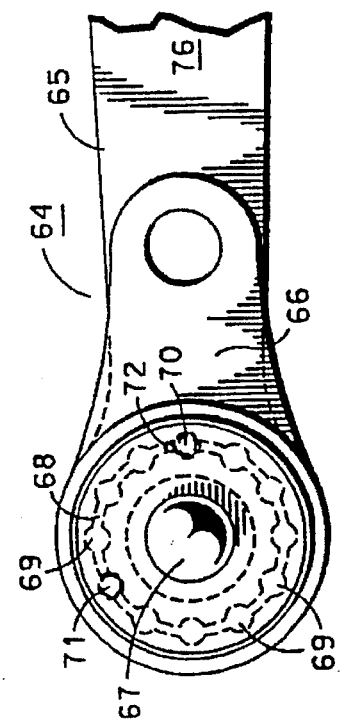
Fig. 8
Fig. 9
Fig. 10

VARIABLE LENGTH CRANK ARM

This application is a continuation of application Ser. No. 08/217,427, filed Mar. 24, 1994, now abandoned.

BACKGROUND OF THE INVENTION

This invention relates to a crank arm for transferring a cyclist's energy via bicycle pedal to the power train of a bicycle and, in particular to a variable length crank arm capable of being repetitively altered between elongated and retracted positions as it is rotated through the power and unloading strokes of a pedaling cycle.

FIELD OF THE INVENTION

It has long been recognized that by increasing the length of a crank arm to provide a longer moment arm, the pedaling force of a cyclist will be increased. Drake's paper entitled "*Circular Thinking*", published in the July 1992 issue of "Bicycling", teaches that, contrary to popular belief, cyclists are not able to pull up on pedals during the upstroke of the pedaling cycle. He has discovered that a cyclist applies a continuous downward force throughout the entire pedaling cycle of a bicycle because cyclists push down with both feet at the same time. Additionally, studies at the University of Minnesota show that during the upward unloading stroke of the pedaling cycle, the unloading stroke leg of the cyclist generates a negative retarding force of more than 25% against the downward force of the power stroke leg. In considering Drake's findings, we have discovered that increasing the length of a crank arm only increases the overall pedaling circumference of the pedaling cycle and it has little or no effect in reducing the negative retarding force generated by the rear leg.

U.S. Pat. No. 4,960,013, granted to Sanders, discloses a telescopic crank arm capable of increasing its length during the downward power stroke of a pedaling cycle, and decreasing its length during the upward stroke. Although it is believed that Sanders failed to recognize that the rear leg of a cyclist generates counteracting force during the unloading stroke, his telescopic crank arm would appear to overcome some of the aforementioned problems. Such telescopic crank arms can reduce some of the negative retarding forces described by Drake. However, it has been found that telescopic crank arms have not been well received within the biking community due to their cumbersome mechanisms, their increased coefficient of friction, and their often erratic and bothersome pedaling action.

It is therefore an object of this invention to provide a variable length bicycle crank arm having a pivot means to increase its length during the downward power stroke of a pedaling cycle and decrease its length during the upward unloading stroke of a pedaling cycle.

It is a further object of this invention to provide a variable crank arm having means to adjust the magnitude of increased crank arm length to suit the needs of an individual cyclist.

It is still a further object of this invention to provide a variable bicycle crank arm capable of automatically increasing crank arm length as pedaling resistance is increased.

It is still a further object of this invention to provide a variable length crank arm having a low coefficient of friction throughout its entire 360° pedaling cycle.

Finally, it is an object of this invention to provide a variable length crank arm having a smooth pedaling action throughout its entire 360° pedaling cycle.

It has been discovered that the foregoing objects can be attained with a variable length bicycle crank arm assembly comprising a primary crank arm attached to a secondary crank arm by a pivot means, the secondary crank arm being biased toward a retracted position and capable of being rotated to an extended position during the downward power stroke of a pedaling cycle, the degree of rotation between the extended and retracted positions being controlled by an adjustment means.

Further objects and advantages of this invention will become apparent from a consideration of the drawings and ensuing description.

SUMMARY OF THE INVENTION

A variable length crank arm for a bicycle or the like comprises a primary crank arm attached to a crank set and a secondary crank arm rotatably coupled to the outer end of the primary crank arm. The secondary crank arm has means to apply a force to rotate the secondary crank arm in an underhand throw to an extended position during a power stroke and in an underhand throw to a retracted position during an unloading stroke with spring means imparting a continuous force to rotate the secondary crank arm toward the retracted position.

BRIEF DESCRIPTION OF THE DRAWINGS

FIG. 1 is an elevation view of the preferred embodiment of the present invention showing the secondary crank arm rotated to a retracted position;

FIG. 2 is in elevation view similar to FIG. 1 showing the secondary crank arm rotated to an extended position;

FIG. 5A is a schematic view similar to FIG. 5 showing a pair of variable crank arms on opposite sides of a crank arm set;

FIG. 6 is an elevation view of an alternate embodiment showing the secondary crank arm rotated to a retracted position;

FIG. 7 is an elevation view similar to FIG. 6 showing the secondary crank arm rotated to an extended position;

FIG. 8 is an elevation view showing a further alternate embodiment of the variable length crank arm invention;

FIG. 9 is an elevation view showing an alternate embodiment of the variable length crank arm invention having means to adjust the location of the extended and retracted positions; and FIG. 10 is an elevation view showing a still further alternate embodiment of the variable length crank arm invention.

DETAILED DESCRIPTION OF THE INVENTION

Figure 3:
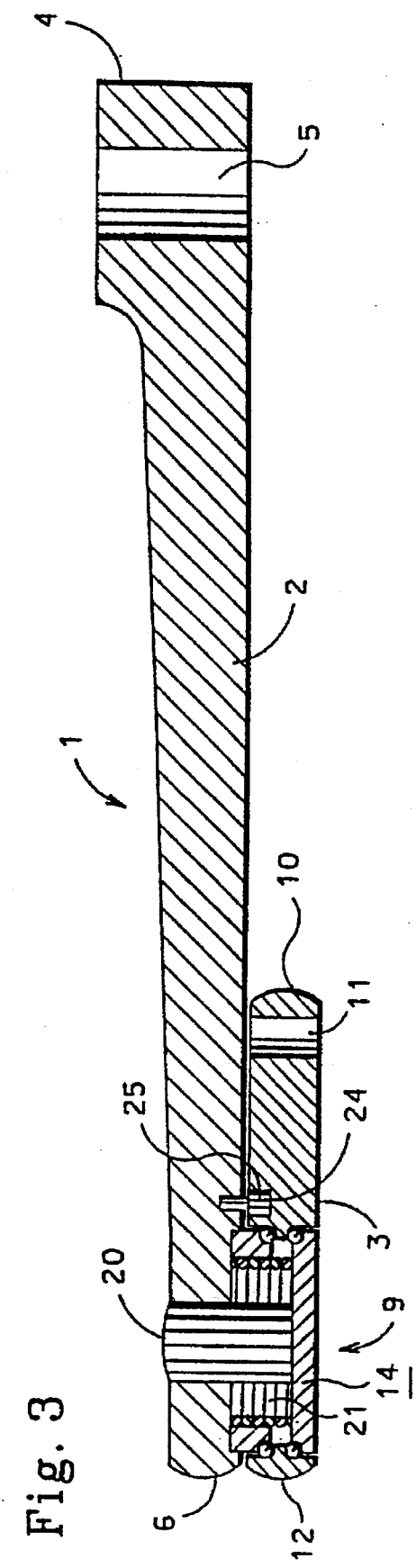
FIG. 3 is a cross-section taken along the lines 3—3 of FIG. 1.

State of the art bicycle crank arms are approximately 7 inches in length. Such crank arms provide a fixed moment arm rotating within a 14-inch diameter pedaling circle centered about the bottom bracket of the bicycle crank set. It has long been known that cyclists can gain extra pedal power by increasing the length of such crank arms. In Rich Carlson's article, *EDDY, Frankie and Mont-Royal*, published in the December 1992 issue of WINNING, the author discloses that he increased his normal 175 mm crank arm length to 177.5 mm to gain extra leverage and power advantage during a race laid out over steep terrain. However, he also discovered that his longer 177.5 crank arm placed him at a disadvantage when he used it over a relatively flat terrain. He concluded that he couldn't turn the 177.5 mm crank arm fast enough to generate a winning pedaling speed.

The aforementioned article by Drake further discloses that even the best riders generate a downward pedal pressure with their rear leg during the unloading upstroke of the pedaling cycle. This downward pressure causes a negative, retarding force against the power stroke of the front leg. When a crank arm is increased in length to gain extra leverage and power, the negative downward force generated by the rear leg is also increased and impedes high speed pedaling on relatively flat terrains.

In an attempt to overcome the disadvantages of fixed length crank arms, various attempts have been made to develop telescopic crank arms capable of increasing and decreasing their length during the power and unloading strokes of the pedaling cycle. These telescopic crank arms are able to produce some extra pedaling force. However, their high coefficient of friction and erratic bothersome pedaling action offset any extra gain in power.

Referring to FIG. 1 of the drawings, the preferred embodiment of the present invention shows a variable length crank arm assembly 1 capable of generating extra power for hills as well as providing a smooth, low friction pedaling action. When used in this description and in the appended claims, variable length crank arm means a crank arm capable of being changed in length during the power stroke of a pedal cycle and capable of being changed to a second, different length during the unloading stroke of a pedal cycle.

The variable length crank arm assembly comprises a primary crank arm 2 pivotally attached to a secondary crank arm 3. The primary crank arm 2 includes a first end portion 4 including conventional means 5 for attaching the crank arm assembly 1 to the bottom bracket of a bicycle (not shown), and a second end portion 6 having an aperture 7 and recessed portion 8, shown in FIGS. 3 and 4, adapted to receive a pivot mechanism 9. The secondary crank arm 3 includes a first end portion 10 having an aperture 11 for attaching a conventional bicycle pedal (not shown), and thereby provide means to apply a force to the secondary crank arm, and a second end portion 12 including an aperture 13, shown in FIGS. 3 and 4, also adapted to receive pivot mechanism 9.

Figure 4:
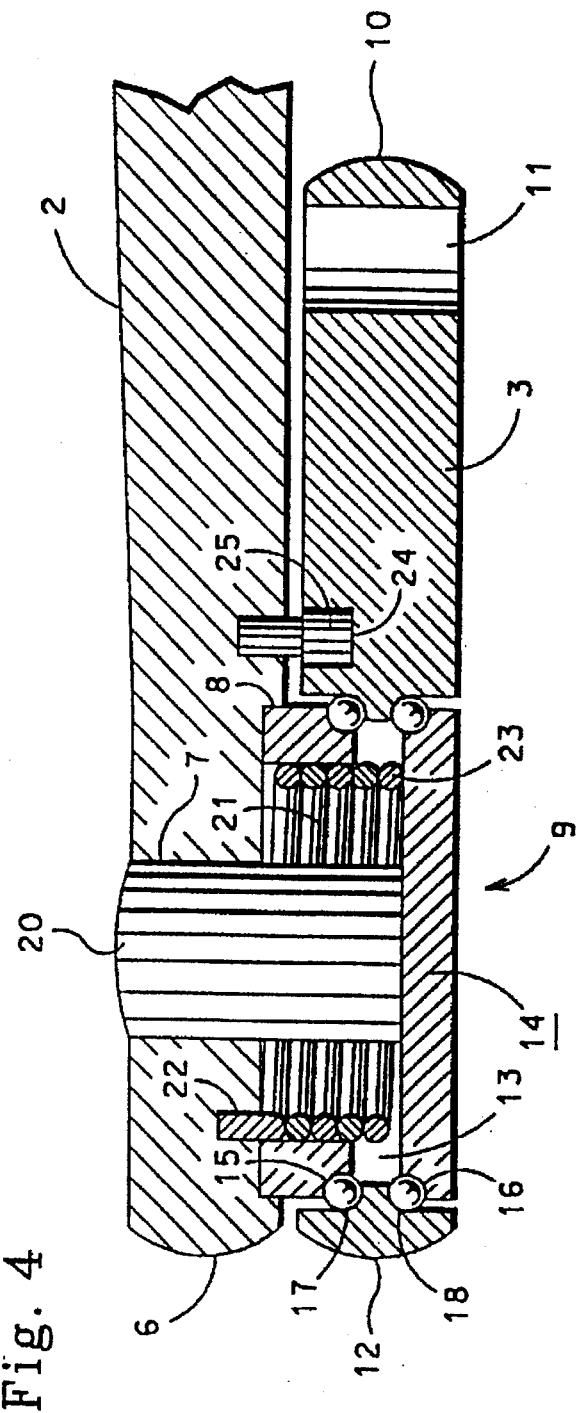
FIG. 4 is an enlarged view showing a portion of FIG. 3.

Referring now to the cross-sectional views shown in FIGS. 3 and 4, pivot mechanism 9 rotatably attached primary crank arm 2 to secondary crank arm 3 and includes a bearing assembly 14 having an inner race 15 and outer race 16 corresponding to an inner race 17 and outer race 18 formed within an aperture 13 extending through end portion 12 of the secondary crank arm. Inner race 15 is fixed within recessed portion 8 of end 6 of primary crank arm 2, and the outer race 16 is attached to primary crank arm 2 by a fastener 20 extending from outer race 16 into aperture 7 of the primary crank arm. With both the inner race 15 and outer race 16 fastened to primary crank arm 2, the secondary crank arm 3 is free to rotate about bearing assembly 14.

Preferably, means are provided to bias the secondary crank arm toward its retracted position. This bias means may be a torsion spring 21, having a first end 22 attached to the primary crank arm 2, and a second end 23 attached to the secondary crank arm 3. Torsion spring 21 is biased to rotate secondary crank arm 3 toward its retracted position shown as 3a in FIG. 1 of the drawings. Referring to FIG. 2, the torsional force of spring 21 may be overcome by the downward force generated by a cyclist during the power stroke of the pedal cycle. As a result, the secondary crank arm is rotated in an arcuate path of travel below the pivot point or bearing assembly 14 to its fully extended position 3b. For simplicity, this arcuate path travel below pivot point 14 will be referred to as an "underhand throw," and it should be understood that the direction of the "underhand throw" may be toward either the extended or retracted positions of the crank arm.

Although the preferred embodiment discloses using a bias means 21, it should be understood that the variable length crank arm can be operated without a bias means. During the development of the preferred embodiment, the inventor built and tested a variable length crank arm having no bias means. It was discovered that such crank arm devices are operable because the downward forces generated during the unloading cycle, as described above in Drake's paper, tend to urge the secondary crank arm toward its retracted position. However, testing has shown that such unbiased devices furnish a less efficient mechanism than the preferred embodiment, and they fail to provide a smooth pedal action.

Preferably, the bias means should be provided in different degrees of resistance, depending on the strength and ability of the rider. It is desirable, if not accelerating on a flat road, that the pedal remain in its retracted position during the power stroke and the bias means should be strong enough to overcome the normal pedal force of the rider. However, when accelerating or going uphill, the increased force on the pedal should pivot the secondary crank arm toward its extended position.

The ability to vary crank arm length by rotating the secondary crank arm 3 in an underhand throw to either a retracted position or extended position as the crank arm moves through its pedal cycle increases and decreases the effective moment arm "L" of the crank arm by variable "a". The maximum and minimum length of variable "a" is determined by a stop means comprising an arcuate slot 24 formed within secondary crank arm 3, and a stop pin 25 extending outward from primary crank arm 2 and communicating with the slot. Slot 24 is concentric to pivot means 9 of the crank arm assembly, and stop pin 25 follows the arcuate profile of slot 24 as the secondary crank arm is rotated toward either its extended or retracted positions 3b or 3a. The length of slot 24 determines the length of variable "a", and stop pin 25 may comprise a roller bearing or the like to reduce friction.

Such alternating changes in the length of a crank arm reduces the negative retarding forces generated by the cyclist's unloading leg as two opposed variable crank arms rotate through successive pedaling cycles on a bicycle. As shown in FIG. 5A, the two crank arms 1 and 1a rotate through their respective pedaling cycles, the longer extended moment arm "L" of the crank arm 1 passing through its downward power stroke works against a retracted smaller moment arm "L" of the opposite crank arm 1a of the crank set moving through the unloading portion of its pedaling cycle. Referring to position "A", or 0° top dead center of a pedaling cycle, secondary crank arm 3 is held in its retracted position by biasing means 21 of the pivot mechanism. In this retracted position, the effective moment arm "L" of crank arm assembly 1 extends from the center of the bottom bracket 26 to the pedal center 27 of the secondary crank arm.

In the form of the invention illustrated in FIG. 5A, the underhand throw movement of the secondary crank arm is limited to 90°. This is the preferred limit to allow a smooth return of the secondary crank arm to its retracted position during the unloading stroke.

As crank arm assembly 1 moves through its power stroke to position "B", the downward force applied by the cyclist against the pedal overcomes the torque of biasing means 21, and the secondary crank arm 3 is rotated to a partially extended position. The effective length of the crank arm assembly is increased by a variable "a", shown as one side of a right triangle, and the new longer moment arm is equal to a length ("L"+"a"). As pedal center 27 moves through the power stroke, variable "a" continues to increase until the secondary crank arm reaches its maximum extended position 3b. At this point maximum power is achieved and the crank arm assembly continues to move through the remaining power stroke.

As the pedaling cycle moves into its unloading stroke, the kinetic energy of bias means 21 begins to overcome the downward force being generated by the cyclist's leg, and the secondary crank arm begins to rotate toward the retracted position until it reaches its fully retracted position 3a. The crank arm assembly now moves through its entire unloading stroke, returning to position "A" with bias means 21 holding it in its fully retracted position 3a. As crank arm assembly 1 moves through its unloading stroke, the secondary crank arm, of the opposite variable length crank arm assembly (not shown), moving through its downward power stroke, and gradually rotates to its fully extended position corresponding to 3b. As the opposed variable length crank arm assemblies move through their respective pedal cycles, the crank arm assembly in the unloading stroke maintains its secondary crank arm 3 in its fully retracted position throughout the entire unloading stroke while the opposite crank arm assembly is extended to a length "L"+"a". As a result, the negative retarding effect of the cyclist's rear leg is reduced proportionally by variable "a" of the opposite crank arm assembly.

The increased force differential between the power and unloading strokes enables a cyclist to increase his pedaling speed on flat terrain and develop additional power on inclines. Additionally, because the pivot mechanism has fewer moving parts in comparison to the telescopic crank arms of the past, it has a lower coefficient of friction and delivers a smoother pedaling action.

A slightly different embodiment of the above preferred embodiment shown in FIGS. 1 to 4 comprises means to modify the stiffness of bias means 21 either by adjusting or replacing the spring means to provide a higher torque which can only be overcome when a cyclist encounters increased pedaling resistance. The modified biasing means maintains the secondary crank arms in their fully retracted positions throughout their entire 360° pedaling cycles as the cyclist pedals over relatively flat terrains. However, once sufficient pedaling resistance is encountered, for example on steep inclines, the increased downward force of the power stroke leg overcomes the higher torque, and the secondary crank arms are rotated to their extended positions during the power stroke of their respective pedaling cycles thereby providing extra power for hills.

Referring to FIGS. 6 and 7 of the drawings, an alternate embodiment of the present variable length crank arm invention is shown comprising a crank arm assembly 30 having a primary crank arm 31 pivotally attached to a secondary crank arm 32. The primary crank arm 31 includes a first end portion 33 having conventional means 34 for attaching the crank arm assembly 30 to the bottom bracket of a bicycle, and a fastener 35 for attaching a bias means 47 adjacent the first end portion of the primary crank arm 31. The primary crank arm also includes a second end portion 36 having an aperture adapted to receive a pivot means 37 and a stop pin 38 radially spaced from pivot means 37.

The secondary crank arm 32 is a substantially triangular shaped arm having a first angle portion 39 including an aperture 40 for attaching a conventional bicycle pedal, a second angle portion 41 including an aperture adapted to receive pivot means 37, and a third angle portion 42 having a fastener 43 for attaching bias means 47. Secondary crank arm 32 further includes a curved surface 44. Curved surface 44 is spaced concentrically from the axis of pivot means 37 and extends between a first detent 45 and a second detent 46. Detent 45 is adapted to engage stop pin 38 when secondary crank arm 32 is rotated to its fully retracted position as shown in FIG. 6, and detent 46 is adapted to engage stop pin 38 when the secondary crank arm is rotated to its fully extended position as shown in FIG. 7.

In this alternate embodiment, as well as in the preferred embodiment, the bias means is shown to comprise springs 21 and 47. It should be understood, however, that other bias means well known in the art, such as pneumatic cylinders, leaf springs, or elastomer bands, could be used to urge the secondary crank arm toward its retracted position without departing from the scope of this invention.

Coil spring 47 includes a first end 48 attached to fastener 35 and a second end 49 attached to fastener 43. The coil spring is in constant tension to provide a continuous force for rotating secondary crank arm 32 toward its retracted position against stop pin 38 as shown in FIG. 6. This retracted position is analogous to position "A" in the schematic pedaling diagram of FIG. 5. As the crank arm assembly moves through its downward power stroke of a pedaling cycle, secondary crank arm 32 rotates in an underhand throw to its extended position as earlier described and shown in FIG. 5. The secondary crank arm remains in this extended position until the increased tension of the coil spring overcomes the downward force of the cyclist and the secondary crank arm rotates in the opposite direction until stop pin 38 engages detent 45 in its retracted position.

As the secondary crank arm rotates through the pedal cycle stop pin 38 follows the contour of curved surface 44 until it engages either detent 45 or detent 46. To reduce friction and provide a smoother pedaling action, stop pin 38 may comprise a roller bearing or other friction reducing devices or materials well known in the art. As disclosed in the preferred embodiment, coil spring 47 may be adjusted, or even replaced with a different spring, to provide a greater or less tension to better suit the needs of an individual cyclist.

A further alternate embodiment, shown in FIG. 8, comprises a variable length crank arm assembly 50 having its primary crank arm 51 and secondary crank arm 53 modified to a more streamlined configuration. Primary crank arm 51 is similar to the aforementioned embodiments in that it includes a conventional means for attaching crank arm assembly 50 to the bottom bracket of a bicycle. The opposite end 54 of the primary crank arm includes an aperture 55 sized to house and protect a pivot mechanism 56.

The secondary crank arm is also similar to the aforementioned embodiments in that it includes means for attaching a pedal. The opposite end 56 of the secondary crank arm includes a hub-like projection 57 for insertion into aperture 55 of the primary crank arm.

Figure 5:
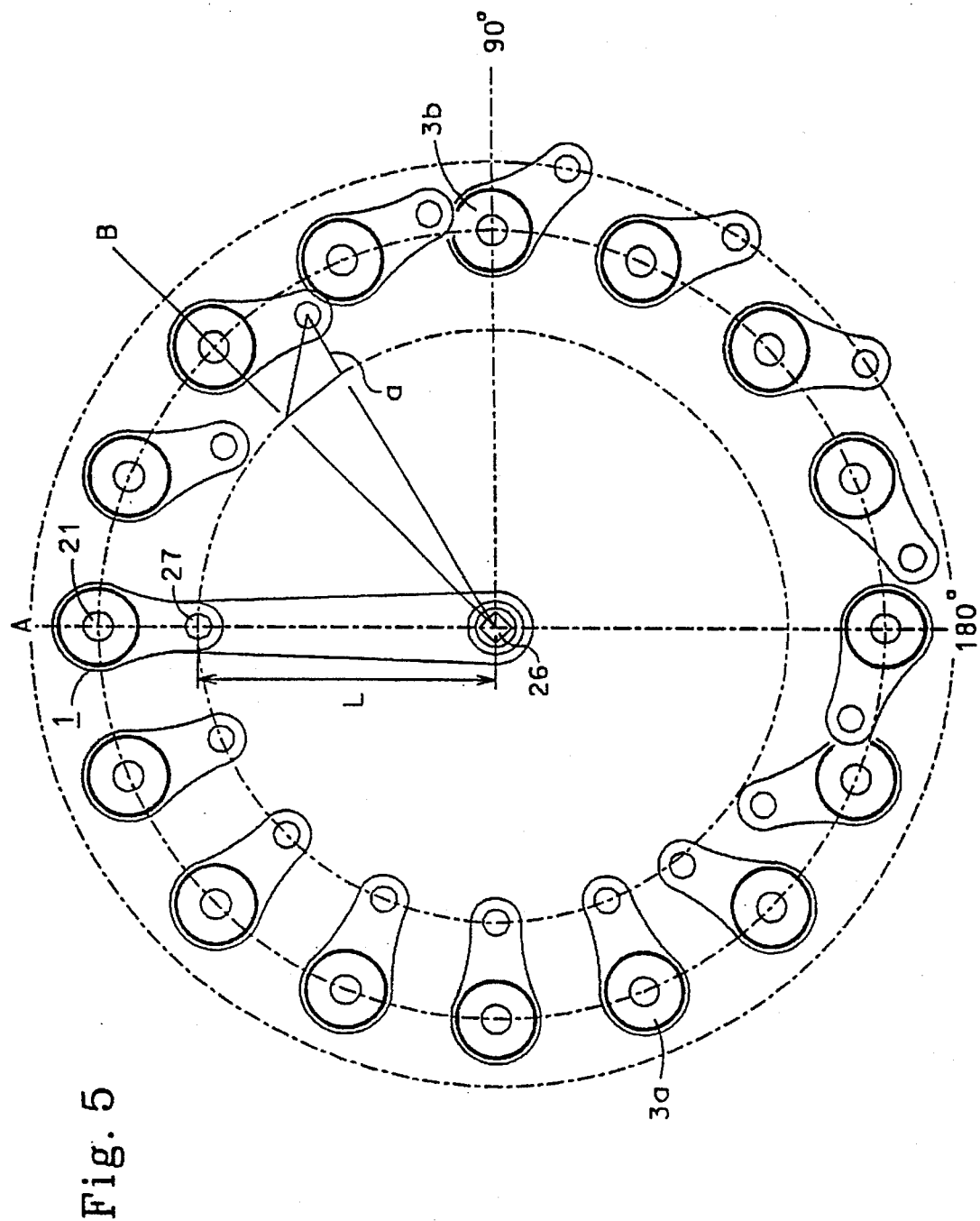
FIG. 5 is a schematic view showing the secondary crank arm of the preferred embodiment being rotated to extended and retracted positions during an entire 360° pedaling cycle.

Pivot mechanism 56 attaches the primary crank arm to the secondary crank arm and provides means for rotating secondary crank arm 53 in an underhand throw to extended and retracted positions as described and shown in FIG. 5. The pivot mechanism includes a bearing 52 fixed within aperture 55. An inner race 58, and an outer race 59, formed within bearing 52 and hub 57, correspond with an inner race 60 and an outer race 61 formed within aperture 55 and rotatably attach secondary crank arm 53 to primary crank arm 51. A bias means 62, similar to the bias means of the preferred embodiment, is housed within a hollow portion 63 provided by matching depression formed within bearing 52 and hub 57 of the secondary crank arm. The bias means 62 provides a force to rotate secondary crank arm 53 toward its retracted position.

A still further alternate embodiment shown in FIG. 9 includes means for adjusting the extended and retracted positions of the secondary crank arm of this invention by reducing or increasing its degree of rotation about pivot 67. Such adjustable pedal positions make it possible to accommodate the physical requirements of individual cyclists.

As shown in FIG. 9, the adjustable variable length crank arm assembly 64 includes a primary crank arm 65 pivotally attached to a secondary crank arm 66 by a pivot mechanism 67 as heretofore described and shown above. The primary crank arm includes a slot 68 formed within front surface 76 of the primary crank arm and spaced concentrically from pivot mechanism 67.

A plurality of radially spaced apart threaded apertures 69 extend from the back surface of primary crank arm 65 opposite front surface 76, and each aperture 69 communicates with slot 68. Set screws 70 and 71 are threaded into apertures 69 and extend into slot 68. A stop pin 72 extends from secondary crank arm 66 into slot 68. As the secondary crank arm rotates through the pedaling cycle, stop pin 72 follows slot 68 until it engages either set screw 70 or 71 and prevents further rotation of the secondary crank arm. As shown in FIG. 9, when stop pin 72 engages set screw 70, it prevents further rotation toward the retracted direction, and conversely, when the stop pin engages set screw 71 it prevents further rotation toward the extended direction. By inserting set screws 70 and 71 into different selected aperture 69, the variable length crank arm assembly 64 can be adjusted to change the degree of rotation toward the extended position and retracted position by secondary crank arm and meet the various conditions and requirements of an individual cyclist.

Referring to FIG. 10 of the drawings, an additional alternate embodiment of the present variable length crank arm invention is shown comprising a primary crank arm 23 having an enlarged end portion 74 adapted to receive and house a disk shaped secondary crank arm 75. The disk shaped secondary crank arm is attached to the primary crank arm by a pivot mechanism 76 provided with a bias means as heretofore described, and the alternate arrangement provides a flush, streamlined crank arm having no protrusions.

While this invention has been illustrated and described in accordance with a preferred embodiment, it is recognized that variations and changes may be made therein without departing from the scope of the invention as set forth in the claims.

I claim:

1. A variable length crank arm assembly for transferring energy to a power train comprising:
    a primary crank arm attached to a crank set,
    a secondary crank arm attached to said primary crank arm, said secondary arm having means to apply a force and a rotatable coupling to:
        rotate said secondary crank arm in an underhand throw to an extended position during a power stroke, and
        rotate said secondary crank arm in an underhand throw to a retracted position during an unloading stroke, and
    a bias means imparting a continuous force to rotate said secondary crank arm toward said retracted position.

2. A variable length crank arm assembly as set forth in claim 1 includes a stop means to limit said extended position and said retracted position of said secondary crank arm.

3. A variable length crank arm assembly as set forth in claim 1 wherein said rotatable coupling includes a bearing fixed to said primary crank arm, said bearing being rotatably attached to said secondary crank arm.

4. A variable length crank arm assembly as set forth in claim 1 wherein said bias means includes a torsion spring having a first end fastened to said primary crank arm and a second attached to said secondary crank arm.

5. A variable length crank arm assembly as set forth in claim 2 wherein said stop means includes:
    a slot formed within said secondary crank arm, said slot concentric to said rotatable coupling and adjacent said primary crank arm, and
    a stop pin extending outward from said primary crank arm and engaging said slot, said stop pin being adapted to follow said slot as said secondary crank arm is rotated.

6. A variable length crank arm assembly as set forth in claim 5 wherein said stop pin includes a bearing adapted to follow said slot.

7. A variable length crank arm assembly as set forth in claim 1 wherein said variable length crank arm assembly includes adjustment means to change the degree of rotation to said extended position and said retracted position.

8. A variable length crank arm assembly as set forth in claim 7 wherein said adjustment means includes:
    a slot formed within said primary crank arm, said slot concentric to said rotatable coupling and adjacent said secondary crank arm,
    a plurality of spaced apart apertures positioned along said slot, each aperture extending through said primary crank arm and communicating with said slot,
    at least one limit pin extending through a selected aperture, said limit pin extending into said slot, and
    a stop pin extending from said secondary crank arm and engaging said slot, said stop pin being adapted to follow said slot as said secondary crank arm is rotated, said stop engaging said limit pin to prevent rotation of said secondary crank arm.

9. A variable length crank arm assembly as set forth in claim 8 wherein said adjustment means includes:
    a first limit pin extending through a selected aperture and into said slot to engage said stop pin, said stop preventing rotation toward said extended position, and
    a second limit pin extending through a selected aperture and into said slot to engage said stop pin, said stop pin preventing rotation toward said retracted position.

10. A variable length crank arm assembly as set forth in claim 8 wherein said apertures and said limit pin are threaded.

11. A variable length crank arm assembly as set forth in claim 8 wherein said stop pin includes a bearing adapted to follow said slot.

12. A variable length crank arm assembly as set forth in claim 1 wherein said variable length crank arm assembly includes:
    an aperture extending through said primary crank arm, said aperture adapted to encircle and hold said rotatable coupling, a hub portion extending from said secondary crank arm and inserted into said aperture of said primary crank arm, said hub portion being rotatably attached to said rotatable coupling.

13. A variable length crank arm assembly as set forth in claim 12 wherein said rotatable coupling includes a bearing secured within said aperture of said primary crank arm.

14. A variable length crank arm assembly as set forth in claim 12 wherein said bias means includes a torsion spring having a first end fastened to said primary crank arm and a second end attached to said secondary crank arm.

15. A variable length crank arm assembly as set forth in claim 12 wherein said stop means includes:

a slot formed within a surface of said secondary crank arm, said slot concentric to said rotatable coupling and adjacent to said primary crank arm, and a stop pin extending outward from said primary crank arm and engaging said slot, said stop pin being adapted to follow said slot as said secondary crank arm is rotated.

16. A variable length crank arm assembly as set forth in claim 15 wherein said stop pin includes a bearing adapted to follow said slot.

17. A variable length crank arm assembly as set forth in claim 1 wherein said secondary crank arm includes at least three sides, said secondary crank arm including:

a first angle portion including means to apply a force, a second angle portion attached to said rotatable coupling, and a third angle portion attached to said bias means.

18. A variable length crank arm assembly as set forth in claim 17 wherein said rotatable coupling includes a bearing secured to said primary crank arm, said bearing being rotatably attached to said secondary crank arm.

19. A variable length crank arm assembly as set forth in claim 17 wherein said bias means is a coil spring having a first end fastened to said primary crank arm and a second end attached to said secondary crank arm.

20. A variable length crank arm assembly as set forth in claim 19 wherein said second end of said coil spring is attached to said third angle portion of said secondary crank arm.

21. A variable length crank arm assembly as set forth in claim 17 wherein said stop means includes:

a cam surface formed along one of said three sides, said cam surface concentric to said rotatable coupling, and a stop pin extending outward from said primary crank arm and engaging said cam surface, said stop pin being adapted to follow said cam surface as said secondary crank arm is rotated.

22. A variable length crank arm assembly as set forth in claim 21 wherein said stop pin includes a bearing adapted to follow said cam surface.

23. A variable length crank arm assembly as set forth in claim 1 wherein:

said secondary crank arm is disk shaped, and said primary crank arm includes an enlarged end portion having a circular recessed portion conforming to said disk shaped secondary crank arm, said circular recessed portion housing said disk shaped secondary crank arm.

24. A variable length crank arm assembly as set forth in claim 1 having a first and a second variable length crank arm assembly attached to opposite sides of said crank set, said first and said second variable length crank arm assemblies alternately passing through said power strokes and said unloading strokes wherein:

said secondary crank arm of the variable length crank arm assembly in said power stroke is rotated to extended position "L+a", and said secondary crank arm of the opposite variable length crank arm assembly in said unloading stroke is rotated to a retracted position "L", thereby reducing a negative downward force on said pedal in the unloading stroke proportionally by the difference between extended position "L+a" and retracted position "L".

25. A variable length crank arm assembly as set forth in claim 24 wherein said first and second variable crank arm assemblies each include a stop means to limit said extended position and said retracted position of said secondary crank arm.

26. A variable length crank arm assembly as set forth in claim 1 wherein said continuous force of bias means is adjusted to rotate said secondary crank arm to said retracted position "L" during the full length of said power strokes pedaled on flat terrains.

27. A variable length crank arm assembly for transferring energy to a power train comprising:

a primary crank arm attached to a crank set, a secondary crank arm attached to said primary crank arm, said secondary crank arm having means to apply a force and a rotatable coupling to:

rotate said secondary crank arm in an underhand throw to an extended position during a power stroke, and rotate said secondary crank arm in an underhand throw to a retracted position during an unloading stroke, and a stop means to limit said extended position and said retracted position of said secondary crank arm.

28. A variable length crank arm assembly as set forth in claim 27 wherein said stop means limits rotation of said secondary crank arm to approximately 90°.

29. A variable length crank arm assembly as set forth in claim 27 wherein in the retracted position said secondary crank arm is substantially parallel to said primary crank arm and in the extended position said secondary crank arm is at approximately right angles to said primary crank arm.

* * * * *